United States Patent
Gao et al.

(10) Patent No.: US 10,452,955 B2
(45) Date of Patent: Oct. 22, 2019

(54) SYSTEM AND METHOD FOR ENCODING DATA IN AN IMAGE/VIDEO RECOGNITION INTEGRATED CIRCUIT SOLUTION

(71) Applicant: GYRFALCON TECHNOLOGY INC., Milpitas, CA (US)

(72) Inventors: Xiang Gao, San Jose, CA (US); Lin Yang, Milpitas, CA (US); Wenhan Zhang, Mississauga (CA)

(73) Assignee: Gyrfalcon Technology Inc., Milpitas, CA (US)

( * ) Notice: Subject to any disclaimer, the term of this patent is extended or adjusted under 35 U.S.C. 154(b) by 103 days.

(21) Appl. No.: 15/871,945

(22) Filed: Jan. 15, 2018

(65) Prior Publication Data

US 2019/0220700 A1     Jul. 18, 2019

(51) Int. Cl.
| | | |
|---|---|---|
| G06K 9/00 | (2006.01) |
| G06K 9/62 | (2006.01) |
| G06K 9/66 | (2006.01) |
| G06F 13/14 | (2006.01) |
| G06E 1/00 | (2006.01) |
| G06K 9/46 | (2006.01) |
| G06N 3/08 | (2006.01) |
| G06N 3/04 | (2006.01) |
| G06T 9/00 | (2006.01) |

(52) U.S. Cl.
CPC ......... *G06K 9/6256* (2013.01); *G06K 9/4642* (2013.01); *G06K 9/6262* (2013.01); *G06N 3/04* (2013.01); *G06N 3/08* (2013.01); *G06T 9/002* (2013.01)

(58) Field of Classification Search
USPC ........ 382/157, 118, 156, 195, 225; 345/519; 706/20
See application file for complete search history.

(56) References Cited

U.S. PATENT DOCUMENTS

| 5,140,670 A | * | 8/1992 | Chua | G06N 3/0635 706/29 |
|---|---|---|---|---|
| 10,248,907 B2 | * | 4/2019 | Gokmen | G06N 3/0472 |
| 2008/0082468 A1 | * | 4/2008 | Long | G06K 9/00147 706/12 |
| 2008/0212887 A1 | * | 9/2008 | Gori | G06K 9/4619 382/248 |
| 2008/0215231 A1 | * | 9/2008 | Breed | G08G 1/161 701/117 |

(Continued)

*Primary Examiner* — Kathleen Y Dulaney
(74) *Attorney, Agent, or Firm* — Dorsey & Whitney LLP

(57) ABSTRACT

Methods of encoding image data for loading into an artificial intelligence (AI) integrated circuit are provided. The AI integrated circuit may have an embedded cellular neural network for implementing AI tasks based on the loaded image data. An encoding method may apply image splitting, principal component analysis (PCA) or a combination thereof to an input image to generate a plurality of output images. Each output image has a size smaller than the size of the input image. The method may load the output images into the AI chip, execute programming instructions contained in the AI chip to generate an image recognition result based on the at least one of the plurality of output images, and output the image recognition result. The encoding method also trains a convolution neural network (CNN) and loads the weights of the CNN into the AI integrated circuit for implementing the AI tasks.

15 Claims, 9 Drawing Sheets

(56) References Cited

U.S. PATENT DOCUMENTS

| | | | |
|---|---|---|---|
| 2009/0116747 A1* | 5/2009 | Duong | G06K 9/32 |
| | | | 382/195 |
| 2011/0188755 A1* | 8/2011 | Bratkovski | G06K 9/00 |
| | | | 382/181 |
| 2011/0211036 A1* | 9/2011 | Tran | H04N 5/23238 |
| | | | 348/14.08 |
| 2015/0065868 A1* | 3/2015 | Liang | A61B 1/31 |
| | | | 600/425 |
| 2015/0379708 A1* | 12/2015 | Abramoff | G06T 7/0012 |
| | | | 382/128 |
| 2017/0372174 A1* | 12/2017 | Wshah | G06K 9/6256 |
| 2017/0372497 A1* | 12/2017 | Hu | G06T 5/007 |
| 2018/0046894 A1* | 2/2018 | Yao | G06F 7/483 |
| 2018/0189596 A1* | 7/2018 | Lee | G06N 20/00 |
| 2018/0260997 A1* | 9/2018 | Petkov | G06T 15/506 |
| 2018/0285714 A1* | 10/2018 | Torng | G11C 11/54 |
| 2019/0034763 A1* | 1/2019 | Guim Bernat | G06K 9/6257 |
| 2019/0056885 A1* | 2/2019 | Mathuriya | G06F 3/0655 |

\* cited by examiner

SYSTEM AND METHOD FOR ENCODING DATA IN AN IMAGE/VIDEO RECOGNITION INTEGRATED CIRCUIT SOLUTION

FIELD

This patent document relates generally to encoding data into an artificial intelligence integrated circuit, and in particular, to encoding data in an image/video recognition integrated circuit solution.

BACKGROUND

Solutions for implementing voice and/or image recognition tasks in an integrated circuit encounter challenges of losing data precision or accuracy due to limited resources in the integrated circuit. For example, a single low-power chip (e.g., ASIC or FPGA) for voice or image recognition tasks in a mobile device is typically limited in chip size and circuit complexity by design constraints. A voice or image recognition task implemented in such low-power chip cannot use data that has the same numeric precision, nor can it achieve the same accuracy when performing the same task in a processing device of a desktop computer. For example, an artificial intelligence (AI) integrated circuit (i.e., an AI chip) in a mobile phone may have an embedded cellular neural network (CeNN) architecture that has only 5 bits per channel to represent data values, whereas a processor in a desktop computer or a server in a cloud computing environment uses a 32-bit floating point or 64-bit double-precision floating point format. In another example, the CeNN architecture of an AI chip may have a low resolution at 224×224 as opposed to a higher resolution (e.g., 1 Megabytes(M), 2M, or even 12M, 20M) available in modern imaging capturing devices. As a result, image or voice recognition models, such as a convolutional neural network, when trained on desktop or server computers and transferred to an integrated circuit with low resolution, low bit-width or low numeric precision, will suffer a loss in performance.

This patent disclosure is directed to systems and methods for addressing the above issues and/or other issues.

SUMMARY

Methods for encoding image data for loading into an artificial intelligence (AI) chip are provided. The AI chip may have an embedded cellular neural network for implementing AI tasks based on the loaded image data. An encoding method may include: receiving an input image having a size; generating a plurality of output images by splitting the input image using one of a plurality of resizing methods, wherein each of the plurality of output images has a size that is smaller than the size of the input image; and loading the plurality of output images into the AI chip. In some scenarios, the plurality of resizing methods may include: selecting an upper left pixel of a sub-area of the input image to form a corresponding pixel in an output image of the plurality of output images; selecting an upper right pixel of the sub-area of the input image to form the corresponding pixel in the output image; selecting an lower left pixel of the sub-area of the input image to form the corresponding pixel in the output image; or selecting an lower right pixel of the sub-area of the input image to form the corresponding pixel in the output image.

The encoding method may also include executing one or more programming instructions contained in the AI chip to: feed at least one of the plurality of output images into an embedded cellular neural network architecture (CeNN) in the AI chip; generate an image recognition result from the CeNN based on the at least one of the plurality of output images; and output the image recognition result.

The encoding method also includes training one or more weights of a convolutional neural network for AI tasks. In some scenarios, the encoding method may include: receiving a set of sample training images comprising one or more sample input images, each sample input image having a size. For each sample input image, the method may include: generating a plurality of sample output images by splitting the sample input image using one of the plurality of resizing methods, wherein each of the sample output images has a size that is smaller than the size of the sample input image.

In some scenarios, an encoding method may apply principal component analysis (PCA) to the input image to generate an output image having a size and a plurality of output image channels, where the size of the output image is smaller than the size of the input image, each pixel in the output image corresponds to one of a plurality of sub-areas of the input image, and each channel of the output image corresponds to one of a plurality of PCA components. The encoding method may further load the plurality of channels in the output image into the AI chip. The encoding may also use the above PCA based method to train the weights of the convolutional neural network from a set of sample training images, and load the trained weights into the CeNN in the AI chip. In some scenarios, an encoding method may combine the above illustrated image splitting method and PCA based method.

BRIEF DESCRIPTION OF THE DRAWINGS

The present solution will be described with reference to the following figures, in which like numerals represent like items throughout the figures.

DETAILED DESCRIPTION

Figure 1:
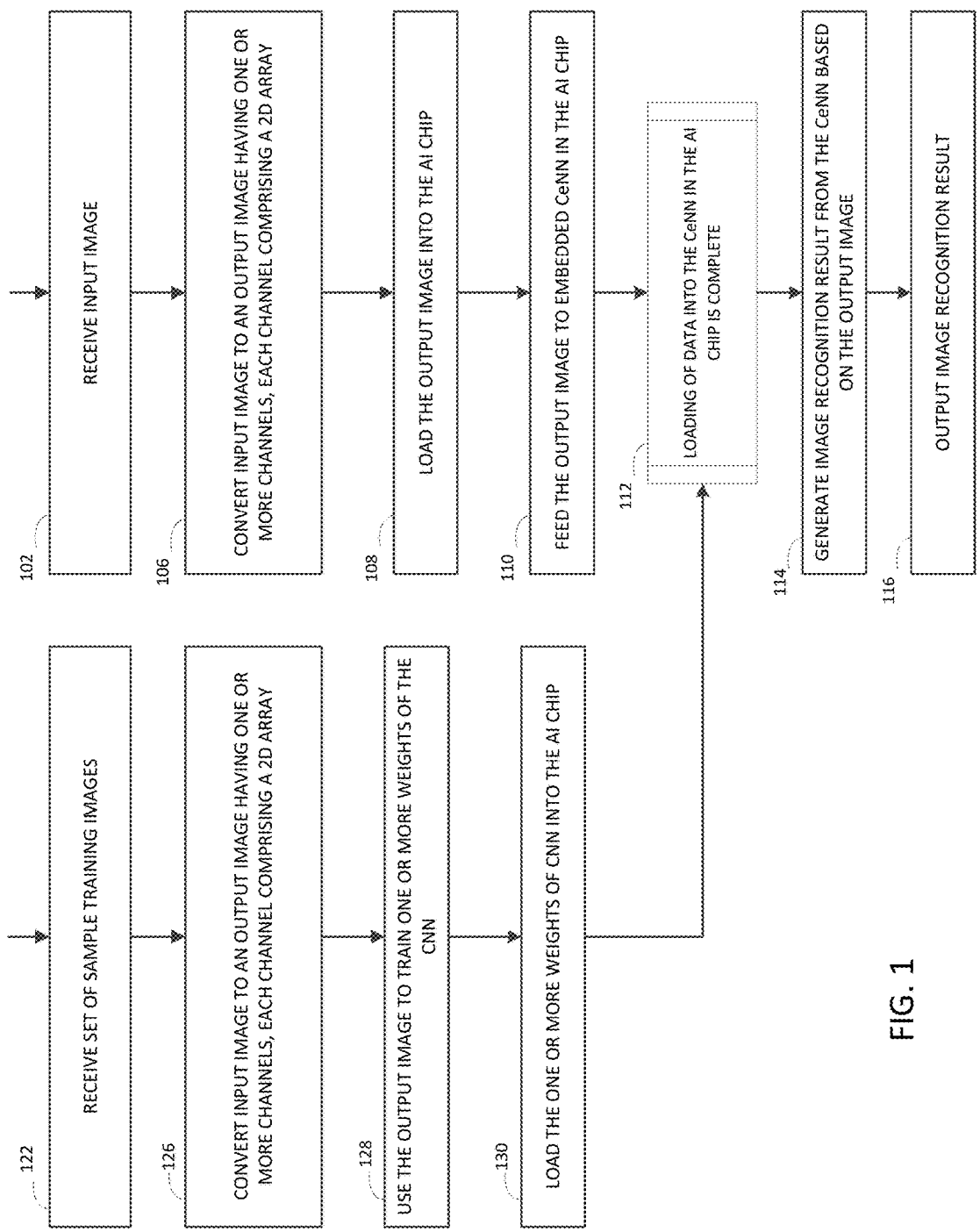
FIG. 1 illustrates a diagram of an example of a process for implementing an image recognition task in an AI chip and training a convolution neural network for such recognition task.

It will be readily understood that the components of the present solution as generally described herein and illustrated in the appended figures could be arranged and designed in a wide variety of different configurations. Thus, the following more detailed description of various implementations, as represented in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Unless defined otherwise, all technical and scientific terms used in this document have the same meanings as commonly understood by one of ordinary skill in the art.

Each of the terms "artificial intelligence logic circuit" and "AI logic circuit" refers to a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Each of the terms "integrated circuit," "semiconductor chip," "chip" and "semiconductor device" refers to an integrated circuit (IC) that contains electronic circuits on semiconductor materials, such as silicon, for performing certain functions. For example, an integrated circuit can be a microprocessor, a memory, a programmable array logic (PAL) device, an application-specific integrated circuit (ASIC) or others. An integrated circuit that contains an AI logic circuit is referred to as an AI integrated circuit or an AI chip.

Each of the terms "data precision," "precision" and "numerical precision" as used in representing values in a digital representation in a memory refers to the maximum number of values that the digital representation can represent. If two data values are represented in the same digital representation, for example, as an unsigned integer, a data value represented by more bits in the memory generally has a higher precision than a data value represented by fewer bits. For example, a data value using 5 bits has a lower precision than a data value using 8 bits.

With reference to FIG. 1, methods of encoding image data for loading into an AI chip are provided. The AI chip may have an embedded CeNN which may include a number of channels for implementing various AI tasks. In some scenarios, an encoding method may include receiving input image data comprising a size and one or more channels 102. For example, an input image captured from an image capturing device, such as a camera on a mobile phone, may have a size of 896×896 and three channels, namely, red (R), green (G) and blue (B) channels in a RGB color space. Other image size and number of channels may also be possible. Receiving the input image data may include receiving the data directly from an image sensor, such as a camera. Receiving input image data may also include retrieving image data from a memory. For example, the memory may contain image data captured by a camera. The memory may also contain video data captured by a video capturing device, such as a video camera. The method may retrieve the video data and extract the image data from the video data.

The encoding method also may include: converting the input image to an output image 106, where the output image may have one or more channels, each channel including a two-dimensional (2D) array of pixels. The output image may have a lower resolution (i.e., smaller image size) or a lower precision that is suitable for the CeNN in the AI chip. In other words, an AI chip that is capable of processing a lower precision or lower resolution data can be used to process input data with a higher precision or higher resolution. In a non-limiting example, the embedded CeNN in the AI chip may have a maximum number of channels, e.g., 3, 8, 16 or other numbers, and each channel may have a two-dimensional (2D) array of 224 by 224 pixels, and each pixel value may have a depth, such as, for example, 5 bits.

Input data for any AI tasks using the AI chip must be encoded to adapt to such hardware constraints of the AI chip. For example, converting the input image to an output image 106 in the above example of AI chip having three channels may include converting the input image to a set of three or fewer output images of size 224×224, where each pixel of the output image has a 5-bit value. The above described image sizes, channel number and depth for each channel are illustrative only. Other sizes may be possible. A number of ways to convert the output image to one or more output images suitable for the CeNN in the AI chip will be explained in further detail later in this document.

The encoding method may also include loading the output image into the AI chip 108 for producing image recognition results. In some scenarios, the step of generating the output image 106 may be implemented by a processing device external to the AI chip. The processing device may also have a peripheral, such as a serial port, a parallel port, or a custom-made circuit board to facilitate transferring of the output image from a memory of the processing device to the AI chip.

In generating recognition results for the input voice data, the method may further include: executing, by the AI chip, one or more programming instructions contained in the AI chip to feed the output image 110 into the embedded CeNN in the AI chip. When loading of data into the CeNN in the AI Chip is complete 112, the method may also include: generating image recognition result from the CeNN based on the output image 114; and outputting the image recognition result 116. Outputting the image recognition result 116 may include storing a digital representation of the recognition result to a memory device inside the AI chip or outside the AI chip, the content of the memory can be retrieved by the application running the AI task, an external device or a process. The application running the AI task may be an application running inside the AI chip should the AI chip also have a processor. The application may also run on a processor external to the AI chip, such as a computing device or a server on the cloud, which may be electrically coupled to or may communicate remotely with the AI chip. Alternatively, and/or additionally, the AI chip may transmit the recognition result to a processor running the AI application or a display.

In some scenarios, the embedded CeNN in the AI chip may store a convolutional neural network (CNN) that was trained and pre-loaded. The structure of the CNN may correspond to the constraints of the AI chip. For example, for above illustrated example of the CeNN, the CNN may correspondingly be structured to have three or fewer channels, each having an image of 224×224 pixels, and each pixel may have a 5-bit value. The training of the CNN may include encoding the training data in the same manner as described in the recognition (e.g., block 106), and an example of training process is further explained.

With continued reference to FIG. 1, a training method may include: receiving a set of sample training images 122. The set of sample training images may include one or more sample input images. The training method may convert each sample input image to one or more sample output images 126 in a similar manner as in block 106 so that the one or more sample output images are suitable for the embedded CeNN in the AI chip. The training process may further include: using the one or more sample output images to train one or more weights of the CNN 128 and loading the one or more trained weights 130 into the embedded CeNN in the AI chip.

The training process may be implemented by a processing device having a processor and may be configured to train one or more weights in the manner described above and store the trained weights in a memory, where the processing device and the memory are external to the AI chip. Similar to block 108, in loading the one or more trained weights 130, the processing device may also have a peripheral, such as a serial port, a parallel port, or a custom-made circuit board to facilitate transferring of the one or more weights of the CNN from a memory of the processing device to the AI chip.

In training the one or more weights of the CNN, the method may include: for each sample input image, receiving an indication of a class to which the sample input image belongs. The type of classes and the number of classes depend on the AI recognition task. For example, an image recognition task designed to recognize a primary object in the image may include a multi-class classifier that assigns any input image into a class of, for example, animal, human, building, scenery, trees, vehicles etc. Alternatively, and/or additionally, each class of the classifier may also have one or more sub-classes. For example, the class corresponding to animal may also have sub-classes, e.g., dog, horse, sheep, cat, etc. Correspondingly, the training process may include receiving an indication for each sample input image of whether the sample input image is from one of the classes or sub-classes illustrated above.

Alternatively, and/or additionally, in some scenarios, an image recognition task may include feature extraction, in which the image recognition result may include, for example, a vector that may be invariant to a given class of samples, for example, a person's hand writing, or an image of a given person. In a CNN, both training and recognition may use a similar approach. For example, the system may use any of the fully connected layers in the CNN, after the convolution layers and before the softmax layers. For example, let the CNN have six convolution layers followed by four fully connected layers. In some scenarios, the last fully connected layer may be a softmax layer in which the system stores the classification results, and the system may use the second to last fully connected layer to store the feature vector. There can be various configurations depending on the size of the feature vector. A large feature vector may result in large capacity and high accuracy for classification tasks, whereas a too large feature vector may reduce efficiencies in performing the voice recognition tasks.

The system may use other techniques to train the feature vectors directly without using the softmax layer. Such techniques may include the Siamese network, and methods used in dimension reduction techniques, such as t-Distributee Stochastic Neighbor Embedding (t-SNE), etc.

Now, block 106 of how to convert the input image to one or more output images suitable for the embedded CeNN is further explained.

Figure 2:
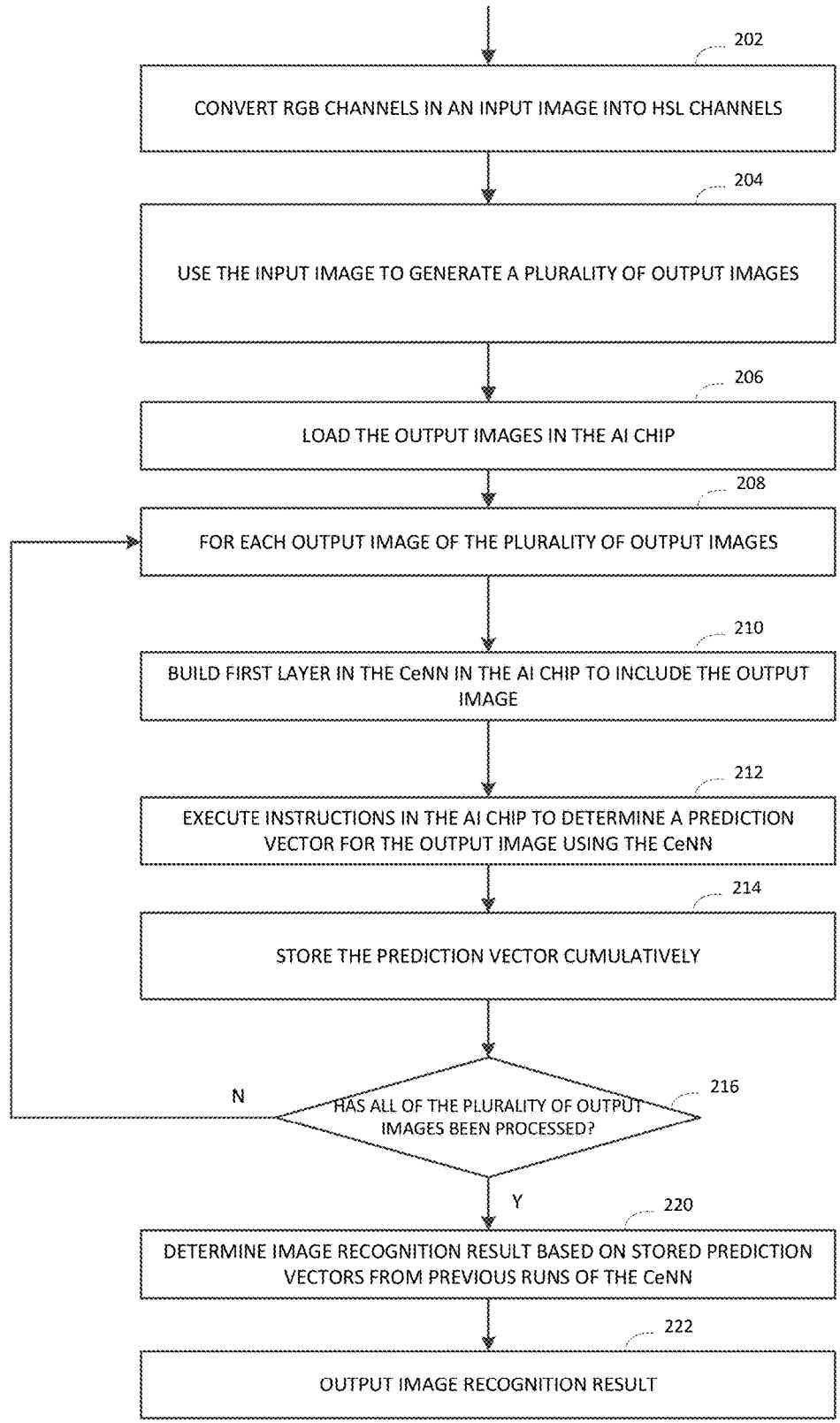
FIGS. 2-3 illustrate diagrams of various examples of processes for encoding image data into an AI chip.
Figure 3:
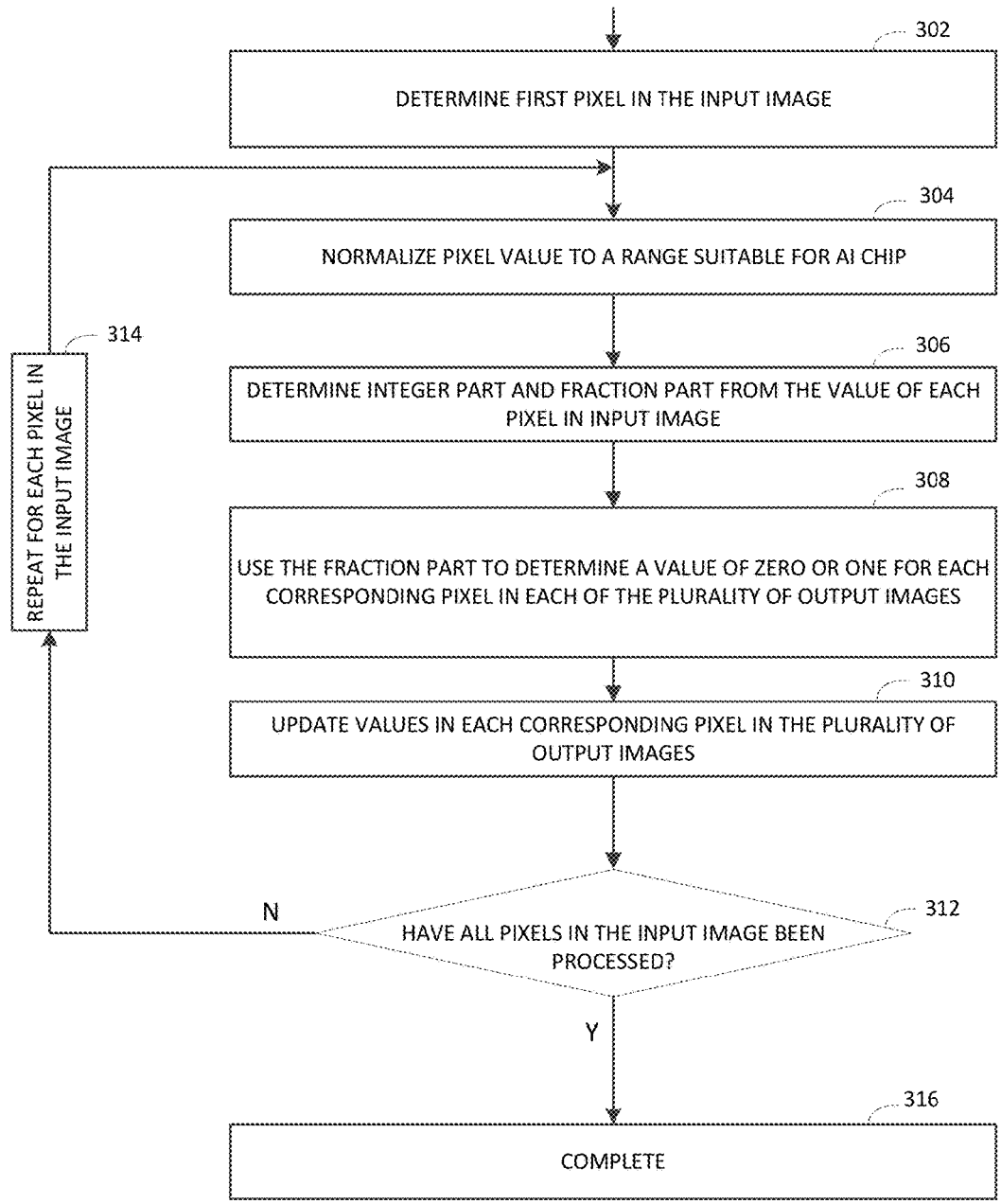
Figure 4:
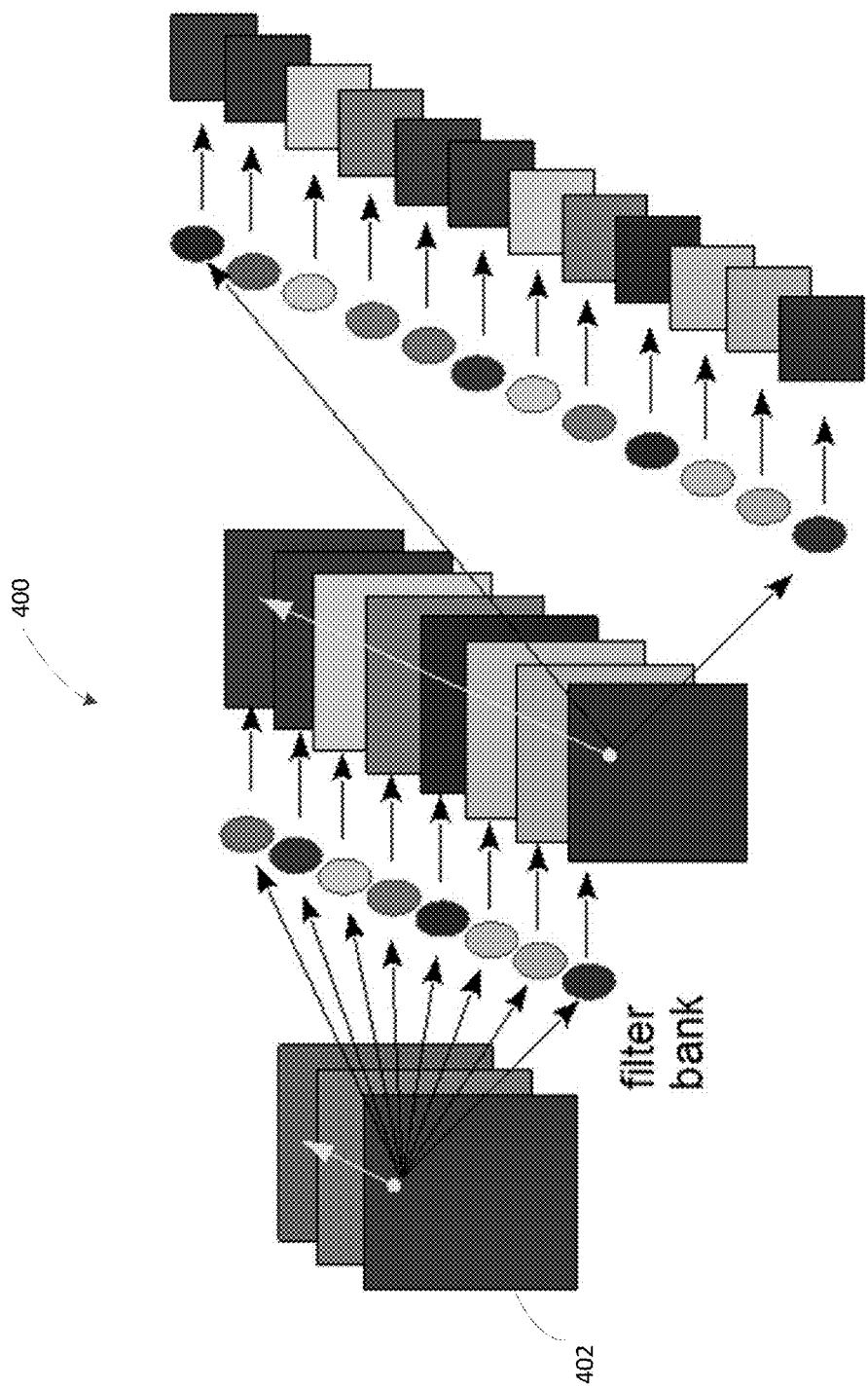
FIG. 4 illustrates a portion of the structure of an example of an embedded cellular neural network architecture in an AI chip.

FIGS. 2-4 illustrate diagrams of various examples of processes for encoding image data into an AI chip. In some embodiments, in FIG. 2, an encoding method may include receiving, by a processor, an input image comprising a plurality of channels 202, each channel having an array of pixels, each pixel having a value. The method may also include: by the processor, using the input image to generate a plurality of output images 204, each output image comprising an array of pixels that also corresponds to the array of pixels in the input image. For example, when an output image has the same size as that of the input image, a corresponding pixel in each respective image resides at the same location. The method may also include loading the plurality of output images into the AI integrated circuit 206.

In a non-limiting example, an input image may be represented by multiple output images, each output image having a lower precision than the input image. Each pixel in the input image may be approximated by an average of the values of corresponding pixels in the plurality of output images. In other words, a value of a higher precision can be approximated by an average of multiple values with a lower precision. For example, a 5-bit data may represent a value from 0 to 31. The value of this 5-bit data may be used to represent a value with a higher precision. For example, the average of three 5-bit numbers 30, 30 and 30 is 30; the average of 31, 30 and 30 is 30.33; the average of 31, 31 and 30 is 30.66; and the average of 31, 31 and 31 is 31, which may require more than 5 bits to store. As such, the average of three 5-bit data may achieve a higher precision than a single 5-bit data.

Accordingly, block 204 may represent a single input image (or a channel of a multi-channel image) having pixels values of a higher precision with a combination of multiple output images having pixel values of a lower precision that are suitable for the AI chip. This reduces the loss of data precision caused by the constraints of the AI chip. Representing the input image by a combination of multiple output images and loading the multiple output images into the AI chip will also "augment" the input data by creating a set of data. When the same step 106 (FIG. 1) is used for training sample data, the input data will be "augmented" so that less training data may be required. As a result, the AI chip will achieve higher accuracy and robustness against random noise.

In some embodiments, with reference to FIG. 3, an encoding method may include, for each pixel in the input image: determining an integer part and a fraction part from each pixel value in the input image 306; using the fraction part to determine a value of zero or one for corresponding pixel in each of the output images 308, where an average value of the corresponding pixels in the output images is approximate to each pixel value in the input image; and updating the values for the corresponding pixels in each of the multiple output images 310 by adding thereto the integer part. The encoding method may determine a first pixel (e.g., the top left pixel) in the input image 302, repeat the steps of 306, 308, and 310 for each pixel in the input image 314 (e.g., repeat each row in a row-by-row fashion) until all of the pixels in the input image have been processed 312. Once the encoding method finishes processing all of the pixels in the input image, the multiple output images are generated 316. The above described method repeats each pixel in a pixel-by-pixel fashion. Alternatively, it may be done in parallel so that all of the pixels are processed at once.

Now, block 308 is further explained with an example. Suppose a pixel in the input image has a value of 30.35 (for example, obtained after normalization), block 308 determines the integer part (i.e., 30) and the fraction part (i.e., 0.33). The process may use the fraction part (i.e., 0.33) to determine the values of corresponding pixels in each of the multiple output images. For example, the encoding method may determine the values of corresponding pixels in three output images to have a value of either zero or one, such as [0 0 1], or [1 0 0], so that the average value of the corresponding pixels in the multiple output images (here, 0.33) is approximate to the fraction part of the pixel value (i.e. 0.35) in the input image. From the above example, whether the value of a corresponding pixel in any of the output images is zero or one can be random as long as the average value of corresponding pixels in all output images is approximate to the fraction part of the pixel value in the input image. In this example, block 310 may further update the values in each of the output images by adding the integer part, i.e., 30. As such, the values for the three output images become [30 30 31] or [31 30 30].

In a non-limiting example, the encoding method may determine the corresponding pixels in the multiple output images based on a function or a table. For example, the table below may be used to map the fraction part of any input pixel value to a set of three values for each of the three output images:

| Input fraction part | First output | Second output | Third output |
|---|---|---|---|
| 0 | 0 | 0 | 0 |
| 0.33 | 1 | 0 | 0 |
| 0.66 | 1 | 1 | 0 |
| 1 | 1 | 1 | 1 |

In the above example, the smallest difference of values in the input image is 0.33, thus, a fraction part 0.35 is rounded down to 0.33, which is used as an entry to the table. That entry gives [1 0 0] for the first, second and third output images, respectively. The above table may include other values as long as the average value for each row is approximate to the fraction part in the first input column. This table can also be expanded to accommodate more output images. For example, an input image may be represented by four output images, and the table for four output images will have four columns of output values, one for each output image; and four rows with the input fraction part having a smallest value of 0.25 (i.e. ¼). In other examples, the table can be adapted to any number of output images as well.

In some scenarios, the encoding method may use a random value generator to generate the values of lower precision for multiple channels, where the average of the lower precision values will have a higher precision. For example, let the value of the input pixel be 134.482, then the method may use a random value generator to produce a sequence of random numbers, e.g., {134.0, 135.0, 133.0, 134.0, . . . } while the expected value (average) of the sequence is 134.482. Each value of that sequence can be represented fully by a low-bit number. The process may pre-define the variance of the random sequence, in this case, for example, a small number.

In some scenarios, the encoding method may optionally include normalizing the value of each pixel of the input image 304 to a real number in a range from zero to the depth of each channel in the AI integrated circuit (e.g., 5 bits) before generating the output images. This will allow the encoding method to maximize use of the available bit-width in the AI chip. Optionally, the encoding method may also include sampling the input image before using the input image to generate the multiple output images. For example, to use the above example table, the encoding method may sample the pixel values of the input image to have a precision so that the smallest difference of values is about 0.33 before applying the table to the pixel values.

Returning to FIG. 2, alternatively and/or additionally, the method may convert the plurality of channels of the input image from one color space to another. For example, the input image may have an RGB, i.e., a red (R), a green (G) and a blue (B) channel, and the method may convert the multiple channels of the input image to a HSL space, i.e. a hue (H), a saturation (S) and a lightness (L) channel 202. The method may also convert the input image to other color space. This may allow the CeNN to adapt to different applications. For example, in face recognition, subjects may be under different illuminations. In the RGB space, all channels will be affected by light changes, whereas in the HSL space, only one or two channels, such as the L channel, will be affected. Thus, converting the input image from the RGB space to the HSL space will help the AI chip to capture such invariance, and thus, improve the recognition performance.

Once the output images are generated, the method may further include loading the output images in the AI chip 206, such as storing the output images in the CeNN of the AI integrated circuit. To accomplish an image recognition task, the AI chip may be configured to: feed at least one of the plurality of output images into the embedded CeNN in the AI chip; generate an image recognition result from the CeNN based on at least one of the plurality of output images; and output the image recognition result. This is further explained in blocks 208-220. For each of the plurality of output images 208: the encoding method may include (i) building a first layer in the embedded CeNN in the AI chip to include the output image 210; (ii) running the CeNN in the AI chip by executing instructions in the CeNN to determine a prediction vector for the output image 212; and (iii) storing the prediction vector cumulatively 214. The method may repeat steps 210-214 until all of the output images have been processed 216. When all of the CeNN runs have been completed for all of the output images, the method may determine the image recognition result based on stored prediction vectors from previous runs of the CeNN in steps in 210-214, and output the image recognition result 222, in a similar manner as described in FIG. 1. This process is now further explained with reference to FIG. 4.

In FIG. 4, in a non-limiting example, the encoding method may store the plurality of output images in the embedded CeNN 400, for example, in the first layer 402 of the embedded CeNN 400 in the AI chip. In above described illustrations, the plurality of output images can be averaged to approximate the input image. The method may use these output images in parallel, where each output image has slightly different values, but the average of the output images is much closer to the input image than any of these individual output images. Accordingly, the method may use these similar output images, the average of which is close to the input image, even the precision of each individual output image is lower than that of the input image.

In running the CeNN (212 in FIG. 2), the method may store the prediction (e.g., the image recognition result) of each run and average out the results of all of the runs. In a non-limiting example, the CeNN may contain a neural network that has 10 classes, and the output from the run of the CeNN may generate a vector of size 10, for example, [0.1, 0.8, 0.0, . . . ,], which gives the probability of class 1 being true as 0.1, class 2 being true as 0.8, . . . , and so on. Each run of the CeNN respectively for each of the multiple output images may generate a prediction vector, and the method may take the average of the prediction vectors from all of the previous runs for the multiple output images generated from the input image.

In storing the prediction result (214 in FIG. 2), the method may store the prediction vector of each run in a softmax layer or store the sum of prediction vectors cumulatively in the softmax layer. The method may further store the final prediction vector in the final softmax layer of the CeNN. In achieving this, the CeNN may be configured so that at least a softmax or the final softmax layer has an increased bit-width than that in other layers. For example, for a CeNN that has a depth of 5 bits, the softmax layer may need to have 8 bits in order to hold a maximum of 32 5-bit values. Alternatively, and/or additionally, the method may store the prediction vectors outside of the AI chip independent of the bit-width of the CeNN. For example, the method may store the prediction vector of each run of the CeNN individually in a softmax layer and subsequently retrieve the content of the softmax layer to store in a memory external to the CeNN in the AI chip before the next run starts.

Returning to FIG. 2, the method may further determine the image recognition result based on stored prediction vectors from the previous runs of the CeNN in the AI chip 220, and output the image recognition result 222. For example, the method may take the average of the prediction vectors explained above from the previous runs and generate a final prediction vector. The method may determine the class that has the highest probability among all of the classes in the final prediction vector and select that class as the final image recognition result. Outputting the recognition result may include retrieving the final prediction vector from the CeNN in the AI chip or a memory external to the AI chip. Outputting the recognition result may also include displaying the result on a display or save the result in a memory, in which the image recognition result is to be used for performing other user functions in one or more applications.

Returning to FIG. 1, for above described encoding methods in FIGS. 2 and 3, a training process for training one or more weights of the CNN for implementing in the embedded CeNN in the AI chip is further explained. Block 126 may include: receiving a set of sample training images comprising one or more sample input images, each sample input image having a plurality of pixels. For each sample input image, the training process may generate a plurality of sample output images, each sample output image having a plurality of pixel values, where each pixel in each sample input image is approximated by a combination of values of corresponding pixels in the plurality of sample output images. The training method may further use one or more sample output images generated from the one or more sample input images to train one or more weights of a CNN, and load the one or more trained weights into the embedded CeNN in the AI chip.

Various encoding methods, as described above, encode an input image to one or more output images with lower precision that are suitable for an embedded CeNN in an AI integrated circuit. Alternatively, and/or additionally, the encoding method may encode an input image into one or more output images with a lower resolution (e.g., smaller image size) which are suitable for the embedded CeNN in the AI chip. Various down-sampling methods that can be implemented for encoding the input image are described with reference to FIGS. 5-8.

Figure 5:
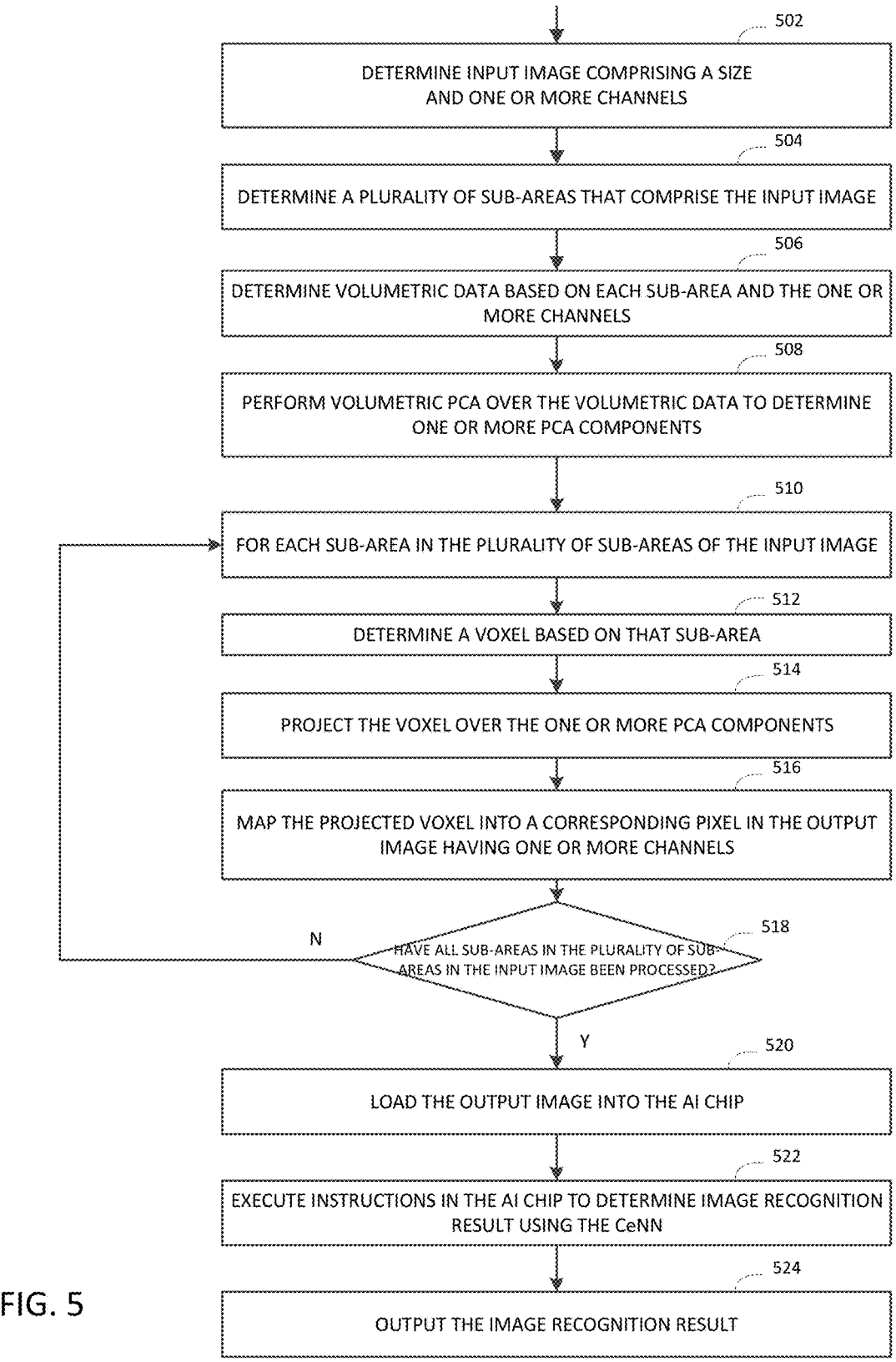
FIG. 5 illustrates a diagram of an example of a process for down-sampling image data into an AI chip using principal component analysis (PCA).

In FIG. 5, an encoding method based on principal component analysis (PCA) may include: receiving, by a processor, an input image having a size and a plurality of channels 502; applying PCA to the input image to generate an output image. The output image is a down-sampled image that may have a size smaller than the size of the input image, where each pixel in the output image corresponds to one of a plurality of sub-areas of the input image. For example, in a 4 to 1 down-sampling, e.g., an image of 896×896 down-sampled to an image of 224×224, each pixel in the output image corresponds to one of a sub-area of 4×4 pixels in the input image. Down-sampling can be done using PCA such that the number of channels in the output image is based on the number of PCA components and each channel in the output image corresponds to one of the PCA components. Each pixel in the output image may be subsequently determined based on the projection of the input image over the PCA components.

The PCA-based method allows the use of PCA components in the image color space to be used as encoded color values, instead of basis vectors in RGB or HSL space. This may allow exploring the 'narrow'/'flat' color spaces when most objects in an image share similar color schemes. It is also considered as a "color-blind" method, which means that it looks at the values in the projected color space, while ignoring the actual RGB values of basis vectors. As a result, the method may preserve as much information as possible (by representing the values of the image using limited number of PCA components) while being less sensitive to transformation of colors, such as color temperature and ambient light changes. This may have advantages in certain scenarios. For example, in a surveillance application in which the images mostly include trees in outdoor scenes, the objects in the images may exhibit similar colors and appear camouflaged.

With further reference to FIG. 5, in generating the output image, the encoding method may determine a plurality of sub-areas that comprise the input image 504. For example, in 4:1 down-sampling, the method may determine a plurality of 4×4-pixel sub-areas that comprise the input image 504 and determine volumetric data based on a plurality of sub-areas and the plurality of channels in the input image 506. In a non-limiting example, given an image of 896× 896×3 (channels), the encoding method may include obtaining volumetric data by choosing a voxel (4×4×3) and scanning the 896×896×3 grid space with a stride of (4×4×3).

The method may perform volumetric PCA over the volumetric data to determine one or more PCA components 508. In generating the output image, each PCA component may correspond to one of the plurality of output image channels of the output image.

Once the PCA components are determined, the method may further include: for each sub-area in the plurality of sub-areas of the input image 510, determining a voxel based on that sub-area and the plurality of channels in the input image 512. In the above illustrated example, a voxel for each sub-area has three channels of 4×4 pixels (i.e. 4×4×3) and it is obtained by scanning across the grid space of the input image. The method may further include projecting the voxel for each sub-area over the one or more PCA components 514, and mapping the projected data into a corresponding pixel in the output image 516. The output image may have one or more channels, each channel corresponding to a PCA component. The method repeats until all sub-areas in the input image have been processed 518.

Here, each channel in the output image corresponds to one of the determined PCA components. For example, in the above illustrated example, a voxel (e.g., 4×4×3) may be represented by 12 values, i.e., 12 PCA components, which correspond to 12 channels in the output image. These 12 values may form 12 channels for one pixel in the output image. By performing PCA, each voxel in the input image thus corresponds to 1×1 pixel by 12 channels in the output image. Accordingly, the encoding method has down-sampled the input image from 4×4 to 1×1, and the number of channels is also changed from 3 to 12. In performing the PCA, the encoding method may define the number of PCA components, or automatically determine that number while performing the PCA.

With further reference to FIG. 5, the encoding method may also include loading the output image into the CeNN in the AI chip 520, execute instructions contained in the AI chip to determine image recognition result 522, and output the image recognition result 524 in a similar manner as described in FIG. 1. In executing instructions in the AI chip, the method may feed one or more channels of the output image into a layer (e.g., the first layer) of the CeNN in the AI chip and generate an image recognition result using the CeNN.

For the above described PCA-based encoding method, a training process for training one or more weights of the CNN for implementing in the embedded CeNN in the AI chip is further explained. With reference to FIG. 1, block 126 may include: receiving a set of sample training images comprising one or more sample input images, each sample input image having a size and a plurality of channels. For each sample input image, the training process may apply the PCA to the sample input image to generate a sample output image having a size and a plurality of output image channels. The size of the sample output image is smaller than the size of the sample input image, where each pixel in the sample output image corresponds to a sub-area of the sample input image, and each channel of the sample output image corresponds to one of the plurality of PCA components. The training method may further use one or more sample output images generated from the one or more sample input images to train one or more weights of a CNN, and load the one or more trained weights into the embedded CeNN in the AI chip.

Figure 6:
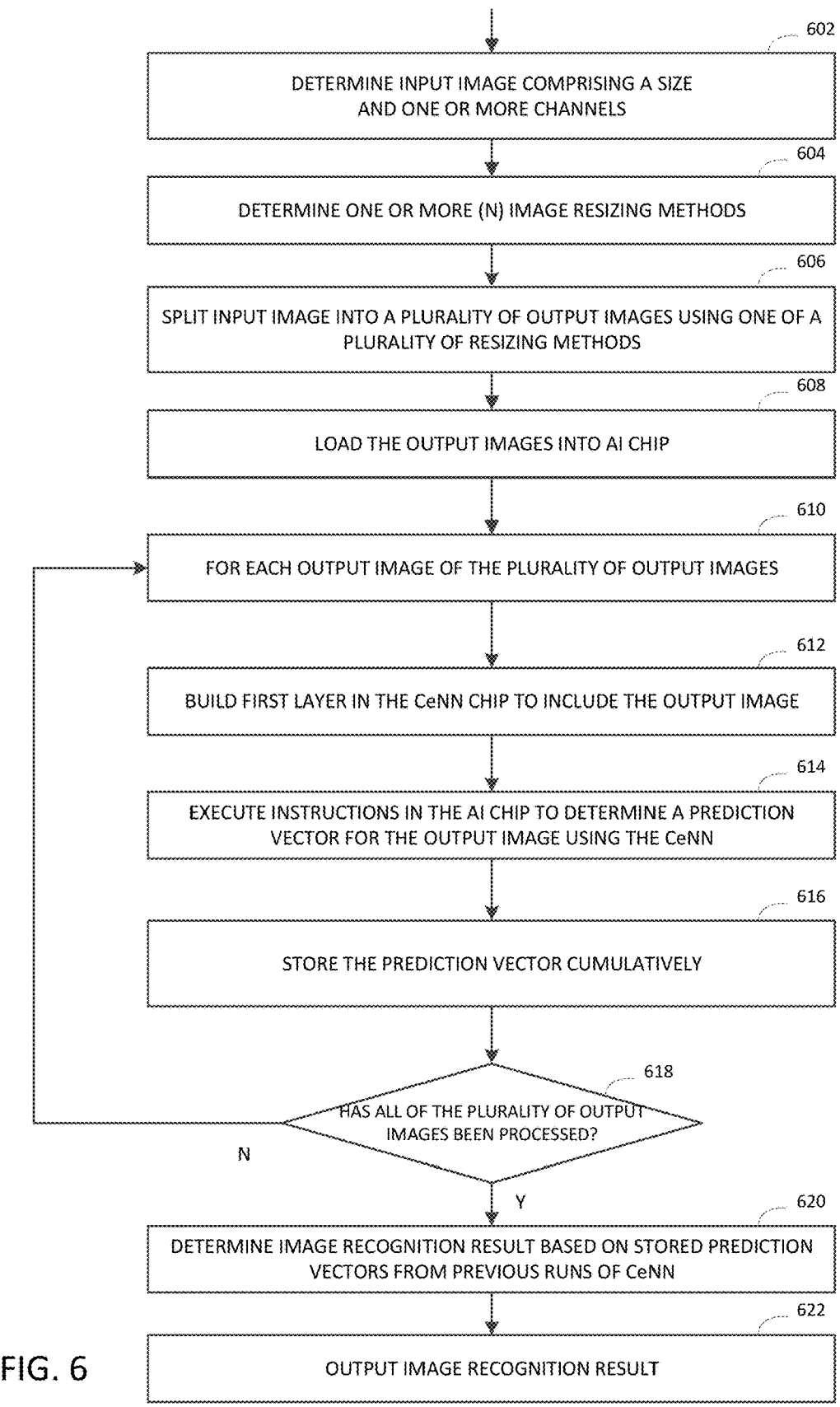
FIGS. 6-7 illustrate diagrams of various examples of processes for down-sampling image data into an AI chip using image splitting.

In FIG. 6, in some embodiments, an encoding method based on image splitting is explained. An encoding method may include: receiving, by a processor, an input image having a size 602; determining one or more image resizing methods 604; generating a plurality of output images by splitting the input image using one of a plurality of resizing methods 606; and loading the plurality of output images into the AI chip 608. By splitting the input image, each of the plurality of output images is down-sampled from the input image and has a size that is smaller than the size of the input image.

Figure 7:
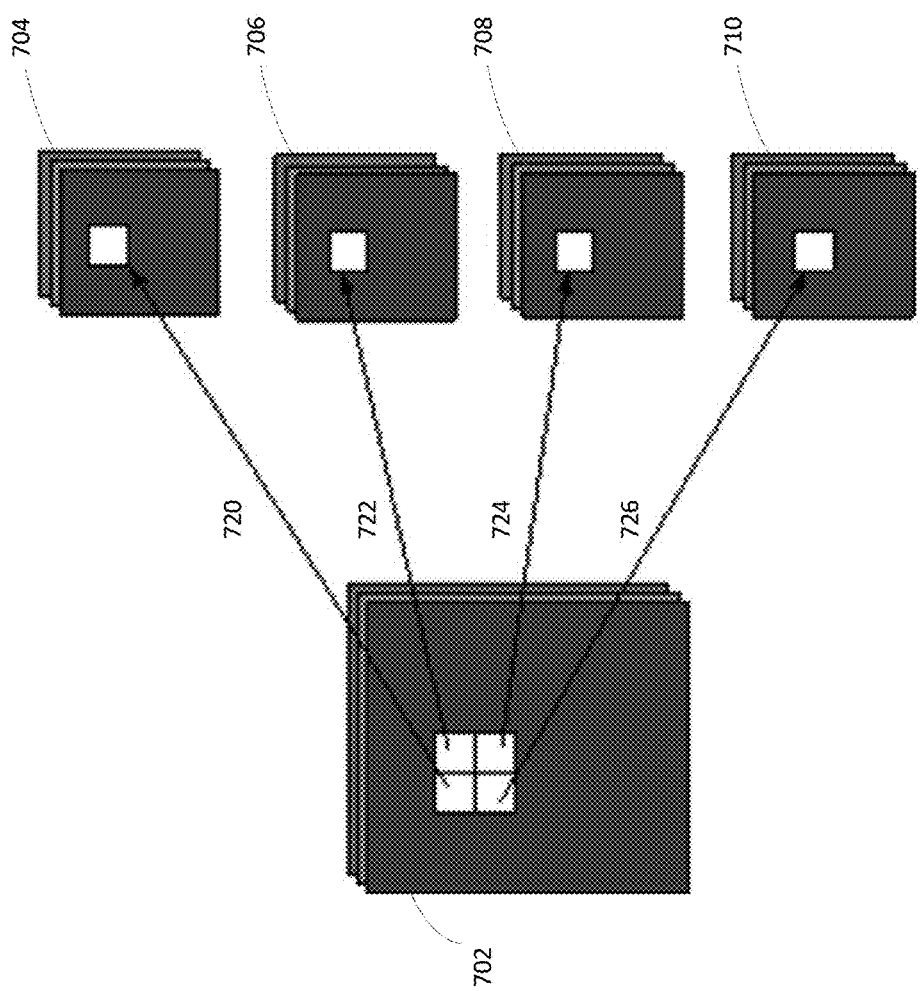

In a non-limiting example, as shown in FIG. 7, an input image 702 has multiple channels, each has a size of 896×896. The encoding method may split the input image 702 to generate 4 output images 704, 706, 708, 710, each using a resizing method. The resizing method may include an interpolation method that takes every sub-area, e.g., a sub-area of 2×2 pixels, in the input image 702 to form an output pixel. The interpolation may include a resizing method, e.g., select the upper left pixel 720, the upper right pixel 722, the lower right pixel 724 or the lower left pixel 726 to respectively form the output images 704, 706, 708, 710. In this example, each of the output images has a size of 448×448. In some scenarios, a sub-area of 4×4 pixels may be selected, and the resulting output image may have a size of 224×224, which is suitable for the CeNN. In some scenarios, if the output image size is not exactly the multiples of 224 as may be suitable for the CeNN, the encoding method may further include interpolating the output image. In some scenarios, the method may shift the image by half a pixel in four different ways, e.g., (0,0), (0.5, 0.0), (0.5, 0.5), or (0, 0.5).

In the above illustrated method in FIG. 7, although each output image has a reduced size, which means loss of information, the method may combine the recognition results from the plurality of output images, to achieve comparable results that can be achieved on the image with large size. This process is further explained with reference to FIG. 6.

Returning to FIG. 6, once the plurality of output images are loaded into the CeNN in the AI chip, the method may run the CeNN for each output image and combine the recognition results from the multiple runs. In some scenarios, the encoding method may feed at least one of the plurality of output images into the embedded CeNN in the AI chip; generate an image recognition result from the CeNN based on the at least one of the plurality of output images; and output the image recognition result. For example, for each of the plurality of output images 610, the method may include: (i) building a first layer in the embedded CeNN in the AI chip to include the output image 612; (ii) running the CeNN in the AI chip by executing instructions contained in the AI chip to determine a prediction vector for the output image 614; and (iii) storing the prediction vector cumulatively 616. The method may repeat the steps (i)-(iii) until all of the plurality of output images have been processed 618. The method may determine an image recognition result based on the stored prediction vectors from previous runs of the CeNN in steps (i)-(iii) 620, and output the image recognition result 622 in a similar manner as described in FIG. 1.

Similar to the method described earlier in FIG. 2, the encoding method may combine the image recognition results from previous runs of the CeNN by averaging the stored prediction vectors. Similarly, the method may store the prediction vector for each run in a softmax layer of the CeNN of the AI chip or in a memory outside the CeNN of the AI chip. For the above described splitting-based method, a training process for training one or more weights of the CNN for implementing in the embedded CeNN in the AI chip is further explained. With reference to FIG. 1, block 126 may include: receiving a set of sample training images comprising one or more sample input images, each sample input image having a size. For each sample input image, the training process may include generating a plurality of sample output images by splitting the sample input image using one of the plurality of resizing methods. Each of the sample output images is down-sampled from a sample input image and has a size that is smaller than the size of the sample input image. The training process may further use one or more sample output images generated from the one or more sample input images to train one or more weights of a convolutional neural network, and load the one or more trained weights into the embedded CeNN in the AI chip.

Each of the PCA-based and splitting-based encoding methods has its own advantages and may be applicable to certain types of input image as explained above. In some embodiments, an encoding method may combine the PCA-based and splitting-based methods. For example, in addition to the steps described in FIG. 6 above, the encoding method may also include: receiving an additional input image having a size and a plurality of channels; applying PCA to the additional input image to generate an additional output image having a plurality of channels; and loading the plurality of channels in the additional output image into the AI chip. The additional output image may have a size that is smaller than the size of the additional input image, and each pixel in the additional output image corresponds to a sub-area of the additional input image. Each channel of the additional output image may correspond to one of a plurality of PCA components.

Figure 8:
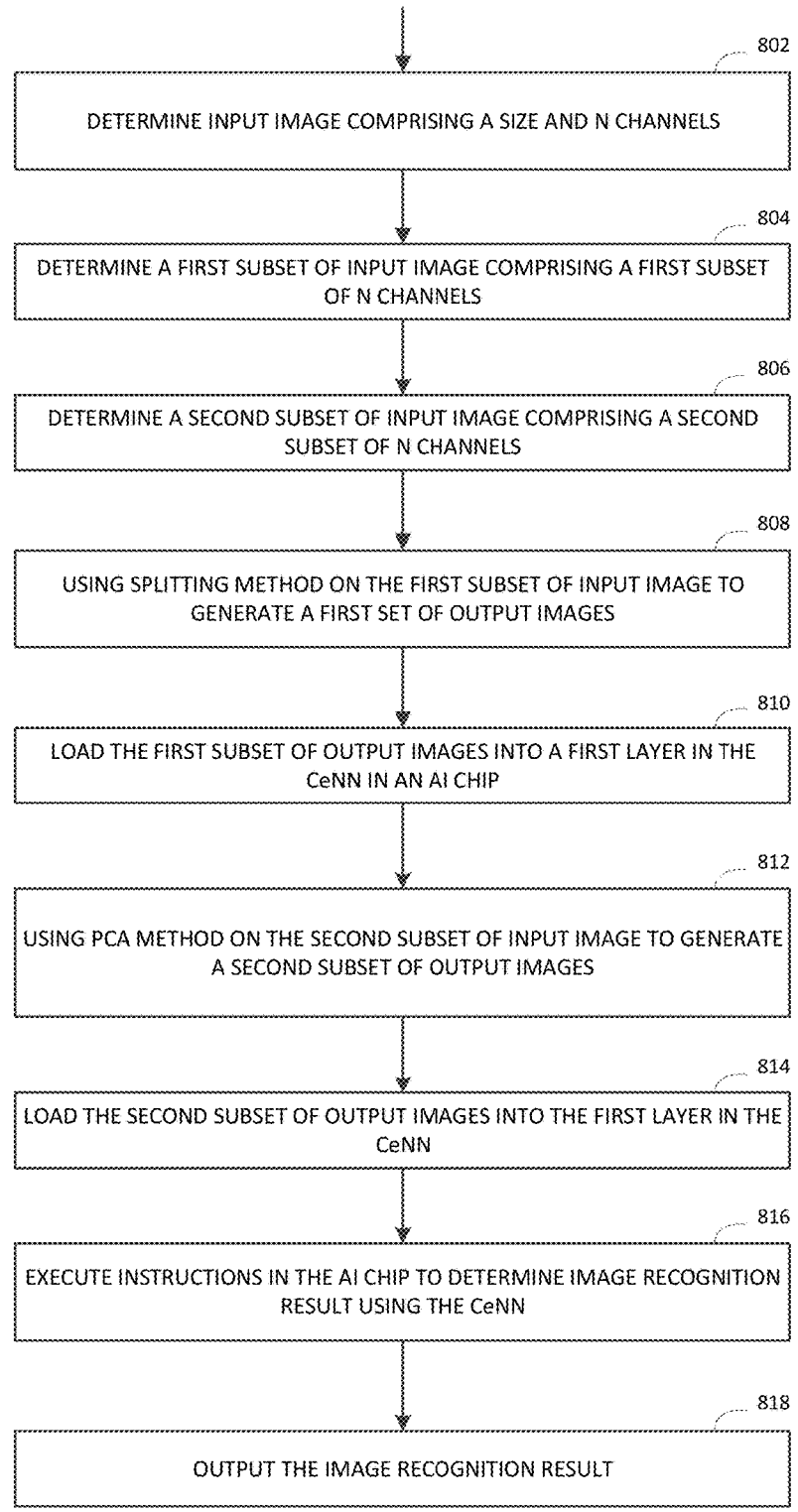
FIG. 8 illustrates a diagram of an example of a process for down-sampling image data into an AI chip by combining PCA and image splitting.

In FIG. 8, an encoding method that combines splitting-based and PCA-based methods may include receiving an input image comprising a size and N channels 802. The method may also include determining a first subset of input image that includes a first subset of N channels 804 and determining a second subset of input image that includes a second subset of N channels 806. For example, for an input image that has 16 input channels, the method may determine the first 4 channels as the first subset of input image and the remaining 12 channels as the second subset of input image.

The encoding method may further use the splitting method on the first subset of input images to generate a first set of output images 808, where each output image in the first set is based on one of a plurality of resizing methods. The method may further use the PCA method on the second subset of input image to generate a second set of output images 812, where each output image in the second set has multiple channels that correspond to a plurality of PCA components. The method may further load the first set of output images 810 and also load the second set of output images 814 into a first layer in the CeNN in the AI chip. The method may further execute instructions contained in the AI chip to determine the image recognition results 816 and output the image recognition result 818 as described earlier in this document.

In the above illustrated example, in executing instructions in the AI chip, if the splitting method generates 4 output images from one input image, the method may run the CeNN four times on the first set of output image to produce the image recognition result for the first set of output images, while running the CeNN one time on the second set of output image (i.e., the remaining 12 channels) to produce the image recognition result for the second set. Alternatively, and/or additionally, the total number of the first set and second set of output images may be fewer than the maximum number of channels of the CeNN in the AI chip, leaving the remaining channels in the CeNN to contain encoded data generated from other encoding methods.

Figure 9:
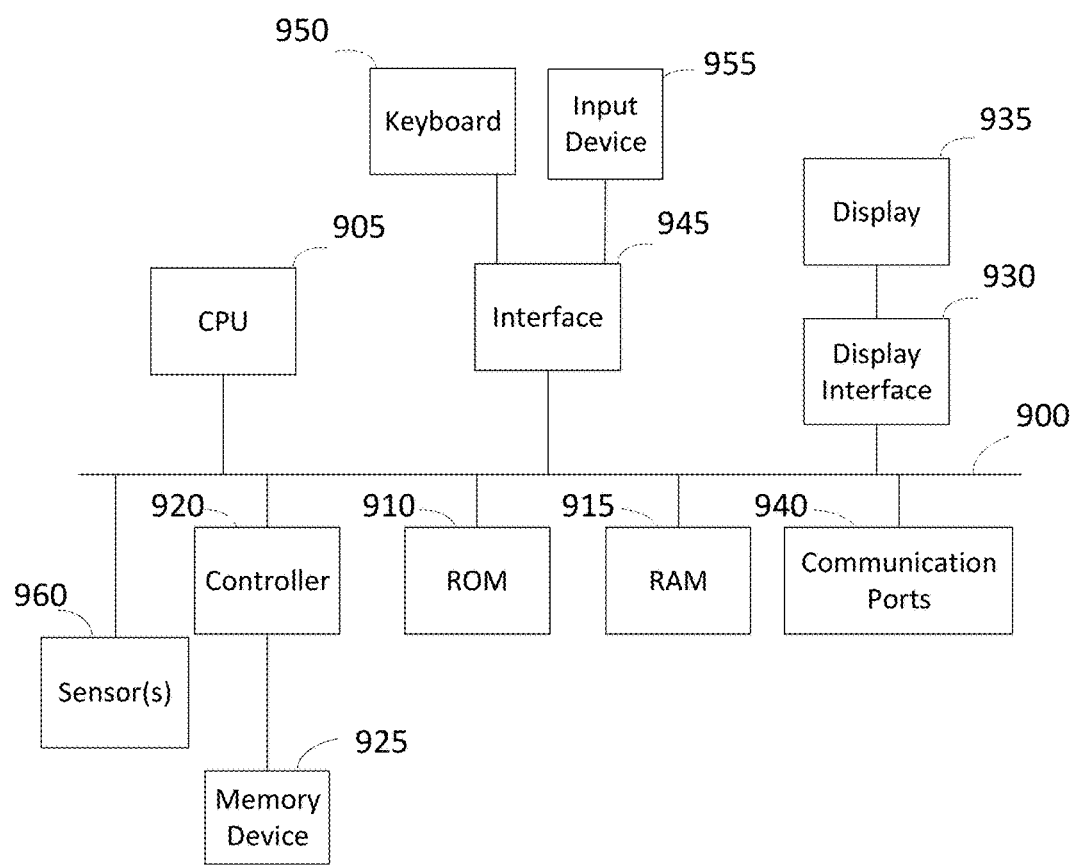
FIG. 9 illustrates various embodiments of one or more electronic devices for implementing the various methods and processes described herein.

FIG. 9 depicts an example of internal hardware that may be included in any electronic device or computing system for implementing various methods in the embodiments described in FIGS. 1-8. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives and other devices capable of storing electronic data constitute examples of memory devices 925. A memory device, also referred to as a computer-readable medium, may include a single device or a collection of devices across which data and/or instructions are stored.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a transmitter and/or receiver, antenna, an RFID tag and/or short-range or near-field communication circuitry. A communication device 940 may be attached to a communications network, such as the Internet, a local area network or a cellular telephone data network.

The hardware may also include a user interface sensor 945 that allows for receipt of data from input devices 950 such as a keyboard, a mouse, a joystick, a touchscreen, a remote control, a pointing device, a video input device and/or an audio input device, such as a microphone. Digital image frames may also be received from an imaging capturing device 955 such as a video or camera that can either be built-in or external to the system. Other environmental sensors 960, such as a GPS system and/or a temperature sensor, may be installed on system and communicatively accessible by the processor 905, either directly or via the communication device 940. The communication ports 940 may also communicate with the AI chip to upload or retrieve data to/from the chip. For example, the computer system may implement the encoding methods and upload the trained CNN weights or the output images for recognition to the AI chip via the communication port 940. The communication port 940 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a cellular neural network architecture may be residing in an electronic mobile device. The electronic mobile device may also have voice or image capturing device, such as a microphone or a camera that captures input audio/video data, and use the built-in AI chip to generate recognition results. In some scenarios, training for the convolutional neural network can be done in the mobile device itself, where the mobile device captures or retrieves training data samples from a database and uses the built-in AI chip to perform the training. In other scenarios, training can be done in a server device or on a cloud. These are only examples of applications in which an AI task can be performed in the AI chip.

The various structures and methods disclosed in this patent document provide advantages over the prior art, whether standalone or combined. For example, an input image having a higher precision may be represented by multiple output images with a lower precision while maintaining the accuracy of the image recognition results using the embedded CeNN in the AI chip. An input image having a higher resolution (e.g., a larger image size) may also be converted to a down-sampled output image having a lower resolution (e.g., a smaller image size) suitable for the embedded CeNN. An input image can also be "augmented" so that the AI chip requires fewer training samples, while achieving higher accuracy and robustness to random noise. Various down-sampling methods presented in this document reduce the image size in order to use the embedded CeNN, while maintaining the accuracy of the image recognition results. The use of PCA in down-sampling an image further allows processing of the image in a color space (or in a "blind color") that may be suitable for certain image recognition tasks in which color changes are not apparent.

Above illustrated embodiments are described in the context of implementing a convolutional neural network solution in an AI chip, but can also be applied to various other applications. For example, the current solution is not limited to implementing the CNN but can also be applied to other algorithms or architectures inside a chip. The image encoding methods can still be applied when the bit-width or the number of channels in the chip varies, or when the algorithm changes.

Other advantages can be apparent to those skilled in the art from the foregoing specification. Accordingly, it will be recognized by those skilled in the art that changes, modifications or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A method of encoding image data for loading into an artificial intelligence (AI) chip, the method comprising:
    receiving, by a processor, an input image having a size;
    by the processor, generating a plurality of output images by splitting the input image using one of a plurality of resizing methods, wherein each of the plurality of output images has a size that is smaller than the size of the input image;
    loading the plurality of output images into the AI chip;
    for each output image of the plurality of output images:
        (i) building a first layer in an embedded cellular neural network (CeNN) architecture in the AI chip to include the output image, and
        (ii) running the CeNN in the AI chip by executing instructions contained in the AI chip to determine a respective prediction vector for the output image;
    determining an image recognition result based on the respective prediction vectors from previous runs of the CeNN in steps (i)-(ii); and
    outputting the image recognition result.

2. The method of claim 1, splitting the input image using one of the plurality of resizing methods comprises:
    selecting an upper left pixel of a sub-area of the input image to form a corresponding pixel in an output image of the plurality of output images;
    selecting an upper right pixel of the sub-area of the input image to form the corresponding pixel in the output image;
    selecting an lower left pixel of the sub-area of the input image to form the corresponding pixel in the output image; or
    selecting an lower right pixel of the sub-area of the input image to form the corresponding pixel in the output image.

3. The method of claim 1, wherein determining the image recognition result based on the respective prediction vectors from previous runs of the CeNN comprises determining the image recognition result based on averaging the respective prediction vectors.

4. The method of claim 3, further comprising storing the respective prediction vector in a softmax layer of the CeNN of the AI chip or in a memory outside the CeNN of the AI chip.

5. The method of claim 1, further comprising:
    receiving, by the processor, an additional input image having a size and a plurality of channels;
    by the processor, applying principal component analysis (PCA) to the additional input image to generate an additional output image having a size and a plurality of output image channels, wherein:
        the size of the additional output image is smaller than the size of the additional input image,
        each pixel in the additional output image corresponds to one of a plurality of sub-areas of the additional input image, and
        each channel of the additional output image corresponds to one of a plurality of PCA components; and
    loading the plurality of channels in the additional output image into the AI chip.

6. The method of claim 5, wherein, applying PCA to the additional input image to generate the additional output image comprises:
    determining volumetric data based on a plurality of sub-areas and the plurality of channels in the additional input image;
    performing volumetric PCA over the volumetric data to determine one or more PCA components, each corresponding to one of the plurality of output image channels in the additional output image;
    for a respective sub-area in the plurality of sub-areas of the additional input image:
        determining a voxel based on the respective sub-area and the plurality of channels in the additional input image,
        projecting the voxel over the one or more PCA components, and
        mapping the projected voxel into a corresponding pixel in the additional output image, wherein each channel in the additional output image corresponds to one of the one or more PCA components.

7. The method of claim 5, further comprising:
feeding at least one of the plurality of output images into a first layer of an embedded cellular neural network (CeNN) architecture in the AI chip;
feeding at least one of the plurality of output image channels of the additional output image into the first layer of the embedded CeNN;
running the CeNN in the AI chip by executing instructions in the CeNN to determine an image recognition result based on the at least one of the plurality of output images and at least one of the plurality of output image channels of the additional output image; and
outputting the image recognition result.

8. A method of encoding image data for loading into an artificial intelligence (AI) chip, the method comprising:
receiving, by a processor, an input image having a size;
by the processor, generating a plurality of output images by splitting the input image using one of a plurality of resizing methods, wherein each of the plurality of output images has a size that is smaller than the size of the input image;
loading the plurality of output images into the AI chip:
receiving a set of sample training images comprising one or more sample input images, each sample input image having a size;
for each sample input image:
generating a plurality of sample output images by splitting the sample input image using one of the plurality of resizing methods, wherein each of the sample output images has a size that is smaller than the size of the sample input image;
using one or more sample output images generated from the one or more sample input images to train one or more weights of a convolutional neural network; and
loading the one or more trained weights into an embedded cellular neural network architecture (CeNN) in the AI chip;
by the AI chip, executing one or more programming instructions contained in the AI chip to:
feed at least one of the plurality of output images into the CeNN in the AI chip;
generate an image recognition result from the CeNN based on the at least one of the plurality of output images; and
output the image recognition result.

9. A method of encoding image data for loading into an artificial intelligence (AI) chip, the method comprising:
receiving, by a processor; an input image having a size and a plurality of channels;
by the processor, applying principal component analysis (PCA) to the input image to generate an output image having a size and a plurality of output image channels, by:
determining a volumetric data based on a plurality of sub-areas and the plurality of channels in the input image;
performing volumetric PCA over the volumetric data to determine one or more PCA components, each corresponding to one of the plurality of output image channels of the output image; and
for a respective sub-area in the plurality of sub-areas of the input image:
determining a voxel based on the respective sub-area and the plurality of channels in the input image, projecting the voxel over the one or more PCA components, and
mapping the projected voxel into a corresponding pixel in the output image; and
loading the plurality of channels in the output image into the AI chip;
wherein:
the size of the output image is smaller than the size of the input image,
each pixel in the output image corresponds to one of a plurality of sub-areas of the input image, and
each channel of the output image corresponds to one of a plurality of PCA components.

10. The method of claim 9, further comprising, by the AI chip, executing one or more programming instructions contained in the AI chip to:
feed one or more channels of the output image into an embedded cellular neural network (CeNN) architecture in the AI chip;
generate an image recognition result from the embedded CeNN based on the one or more channels of the output image; and
output the image recognition result.

11. The method of claim 10, further comprising, by a processor:
receiving a set of sample training images comprising one or more sample input images, each sample input image having a size and a plurality of channels;
for each sample input image:
applying PCA to the sample input image to generate a sample output image having a size and a plurality of output image channels, wherein:
the size of the sample output image is smaller than the size of the sample input image,
each pixel in the sample output image corresponds to a sub-area of the sample input image, and
each channel of the sample output image corresponds to one of the plurality of PCA components; and
using one or more sample output images generated from the one or more sample input images to train one or more weights of a convolutional neural network; and
loading the one or more trained weights into the embedded CeNN in the AI chip.

12. A system for encoding image data for loading into an artificial intelligence (AI) chip, the system comprising:
a processor; and
a non-transitory computer readable medium containing programming instructions that, when executed, will cause the processor to:
receive an input image having a size;
generate a plurality of output images by splitting the input image using one of a plurality of resizing methods, wherein each of the plurality of output images has a size that is smaller than the size of the input image;
load the plurality of output images into the AI chip;
cause the AI chip to:
for each output image of the plurality of output images:
(i) build a first layer in an embedded cellular neural network (CeNN) architecture in the AI chip to include the output image; and
(ii) run the CeNN in the AI chip by executing instructions contained in the AI chip to determine a respective prediction vector for the output image;

determine an image recognition result based on the respective prediction vectors from previous runs of the CeNN in steps (i)-(ii); and output the image recognition result.

13. A system for encoding image data for loading into an artificial intelligence (AI) chip, the system comprising:

a processor; and a non-transitory computer readable medium containing programming instructions that, when executed, will cause the processor to:

receive an input image having a size;

generate a plurality of output images by splitting the input image using one of a plurality of resizing methods, wherein each of the plurality of output images has a size that is smaller than the size of the input image;

load the plurality of output images into the AI chip;

receive an additional input image having a size and a plurality of channels;

apply principal component analysis (PCA) to the additional input image to generate an additional output image having a size and a plurality of output image channels, by:

determining a volumetric data based on a plurality of sub-areas and the plurality of channels in the additional input image;

performing volumetric PCA over the volumetric data to determine one or more PCA components, each corresponding to one of the one or more channels in the additional output image; and for a respective sub-area in the plurality of sub-areas of the additional input image:

determining a voxel based on the respective sub-area and the plurality of channels in the additional input image, projecting the voxel over the one or more PCA components, and mapping the projected voxel into a corresponding pixel in the additional output image, wherein each channel in the additional output image corresponds to one of the one or more PCA components; wherein:

the size of the additional output image is smaller than the size of the additional input image, and each pixel in the additional output image corresponds to one of a plurality of sub-areas of the additional input image, and load the plurality of channels in the additional output image into the AI chip.

14. The system of claim 13, further comprising additional programming instructions configured to cause the AI chip to:

feed at least one of the plurality of output images into a first layer of an embedded cellular neural network (CeNN) architecture in the AI chip;

feed one or more channels of the additional output image into the first layer of the embedded CeNN;

run the CeNN in the AI chip by executing instructions contained in the AI chip to determine an image recognition result based on the at least one of the plurality of output images and one or more channels of the additional output image in the first layer of the embedded CeNN; and output the image recognition result.

15. The system of claim 13, further comprising programming instructions configured to:

receive a set of sample training images comprising a set of sample input images and an additional sample input image, each of the set of sample input images and the additional sample input image has a size;

for each of the set of sample input images:

generate a plurality of sample output images by splitting the sample input image using one of the plurality of resizing methods, wherein each of the plurality of sample output images has a size that is smaller than the size of the sample input image;

receives an additional sample input image;

apply PCA to the additional sample input image to generate an additional sample output image having a size and a second plurality of output image channels, wherein:

the size of the additional output image is smaller than the size of the additional input image, each pixel in the additional output image corresponds to one of a plurality of sub-areas of the additional input image, and each channel of the additional output image corresponds to one of a plurality of PCA components;

use at least one of the plurality of sample output images generated from the one or more sample input images and at least one of the second plurality of output image channels of the additional sample output image to train one or more weights of a convolutional neural network; and load the one or more trained weights into an embedded cellular neural network (CeNN) in the AI chip.

* * * * *